United States Patent [19]

Kawamura et al.

[11] 4,265,977

[45] May 5, 1981

[54] PAPER COATING COMPOSITION OF UNSATURATED ACID AND MONO-OLEFIN POLYMERIZED IN THE PRESENCE OF A PREFORMED STYRENE/BUTADIENE LATEX

[75] Inventors: Takayuki Kawamura, Kawasaki; Kichiya Tazaki; Takashi Sakakiyama, both of Yokohama; Toshio Hasegawa, Tokyo, all of Japan

[73] Assignee: Asahi-Dow Limited, Tokyo, Japan

[21] Appl. No.: 30,392

[22] Filed: Apr. 16, 1979

[51] Int. Cl.³ .................. C08K 3/00; C08L 23/26; C08L 25/10; C08L 33/02
[52] U.S. Cl. .................. 428/511; 260/29.6 TA; 428/314; 525/301; 525/310
[58] Field of Search ............... 260/29.6 TA; 525/301, 525/310; 428/511, 514

[56] References Cited

U.S. PATENT DOCUMENTS

| | | |
|---|---|---|
| 3,081,193 | 3/1963 | Miller et al. |
| 3,359,345 | 12/1967 | Doak et al. .................. 525/301 |
| 3,432,577 | 3/1969 | Serniuk .................. 525/301 |
| 3,594,453 | 7/1971 | Cusano .................. 525/301 |
| 3,644,584 | 2/1972 | Fryd et al. .................. 525/301 |
| 3,671,607 | 6/1972 | Lee .................. 525/301 |
| 3,676,528 | 7/1972 | Severini et al. .................. 525/301 |
| 3,998,772 | 12/1976 | Beerbower .................. 525/301 |
| 4,126,504 | 11/1978 | Wolinski .................. 525/301 |

FOREIGN PATENT DOCUMENTS

| | | | |
|---|---|---|---|
| 46-954 | 11/1971 | Japan .................. | 525/301 |
| 49-20075 | 5/1974 | Japan .................. | 525/301 |
| 828895 | 2/1960 | United Kingdom .................. | 525/301 |

*Primary Examiner*—James C. Cannon
*Attorney, Agent, or Firm*—J. B. Guffey; J. S. Boone

[57] ABSTRACT

Paper coating compositions having an improved combination of properties are prepared by admixing, in the normal proportions and by conventional techniques, one or more conventional paper coating pigments with a particular type of synthetic polymer latex. In such compositions, the particular latex employed is alkali-sensitive and is prepared by emulsion polymerizing (A) from about 10 to about 90 parts by weight of a monomer mixture comprising, based upon the weight of such monomer mixture, (1) from about 10 to about 60 weight percent of an ethylenically unsaturated carboxylic acid monomer and (2) from about 40 to about 90 weight percent of a copolymerizable monoolefin compound in the presence of (B) from about 10 to about 90 parts by weight, on a polymer solids basis, of a copolymer latex comprising a monovinylidene aromatic monomer such as styrene and an open-chain aliphatic conjugated diene such as butadiene.

11 Claims, No Drawings

PAPER COATING COMPOSITION OF UNSATURATED ACID AND MONO-OLEFIN POLYMERIZED IN THE PRESENCE OF A PREFORMED STYRENE/BUTADIENE LATEX

BACKGROUND OF THE INVENTION

The present invention relates generally to paper coating compositions which comprise as major components therein one or more paper coating pigments and one or more of certain alkali-sensitive copolymer latexes as a binder component for such pigment. More particularly, the present invention relates to paper coating compositions comprising a pigment and an alkali-sensitive latex wherein said latex is a synthetic organic copolymer latex prepared by emulsion copolymerizing (A) from about 10 to about 90 parts by weight of a monomer charge comprising (1) from about 10 to about 60 weight percent of an ethylenically unsaturated carboxylic acid and (2) from about 40 to about 90 weight percent of a copolymerizable monoolefin compound in the presence of (B) from about 10 to about 90 parts by weight of the polymer solids of a copolymer latex comprising a monovinylidene aromatic monomer such as styrene and an open-chain aliphatic conjugated diene such as butadiene.

As is well known in the art, carboxylated styrene-butadiene copolymer latexes are useful and generally well suited for use as a binder component for the pigments in conventional paper coating compositions. Moreover, it is also known that such latex is typically not used as the sole binder component in such compositions but instead is generally used in conjunction with natural aqueous pastes such as casein, starch, and the like, in order to improve certain specific properties of the resultant compositions and/or of the ultimate coated paper articles made therefrom. Unfortunately, however, the use of the aforementioned natural aqueous pastes have certain drawbacks associated therewith such as difficulties in controlling the overall properties of the resulting compositions, decomposition of the compositions containing such pastes, and the like. Accordingly, various attempts have been made in recent years to provide coating compositions having the desired combination of properties without requiring the use of the aforementioned natural aqueous pastes and, as a result, certain approaches for achieving that objective have heretofore been proposed.

Typical examples of the aforementioned approaches include (a) those disclosed in U.S. Pat. Nos. 3,081,198; 3,513,121; and West German Patent No. 1,919,379 (i.e., U.S. Pat. No. 3,694,394) wherein an aqueous dispersion is employed which is a blend of (1) a generally alkali-insensitive polymer latex such as, for example, an alkali-insensitive styrene-butadiene copolymer latex and (2) an alkali-sensitive copolymer latex prepared by employing an ethylenically unsaturated comonomer containing a carboxyl group and (b) those disclosed in U.S. Pat. Nos. 3,409,569 and 3,575,913 and Japanese Published Examined Patent Application No. 49-44948 wherein certain carboxylated copolymer latexes such as, for example, copolymers of styrene, butadiene and an ethylenically unsaturated carboxylic acid are employed as a binder component to provide alkaline paper coating grade compositions which can be free of natural pastes such as casein, starch, etc.

While the aforementioned prior art methods appear to provide paper coating compositions and coated paper products which have somewhat improved properties relative to their prior art casein and/or starch-containing counterparts, such methods nevertheless still generally suffer from one or more drawbacks such as limited or unsatisfactory water resistance, undesirable viscosity sensitivity to factors such as changes in the composition pH, insufficient viscosity at low shear rates, inadequate fluidity at high shear rates, and the like. Accordingly, it would be highly desirable to provide improved aqueous paper coating compositions which eliminate (or which at least substantially reduce the extent of) the foregoing difficulties which have heretofore been encountered with the various above-described prior art paper coating compositions.

SUMMARY OF THE INVENTION

In accordance with the present invention such an improved paper coating composition is provided which comprises an aqueous dispersion of at least one paper coating pigment and an alkali-sensitive latex which is prepared by emulsion copolymerizing (A) from about 10 to about 90 parts by weight of a monomer mixture comprising, based upon the weight of such monomer mixture, (1) from about 10 to about 60 weight percent of an ethylenically unsaturated carboxylic acid monomer and (2) from about 40 to about 90 weight percent of a copolymerizable monoolefinic compound in the presence of (B) from about 10 to about 90 parts by weight, on a polymer solids basis, of a copolymer latex comprising, in polymerized form, a nonovinylidene aromatic monomer, an open-chain aliphatic conjugated diene and optionally, but preferably, an ethylenically unsaturated carboxylic acid.

The foregoing compositions of the invention are especially well suited for paper coating applications in that they are characterized by having relatively high viscosity at lower shear rates and relatively high fluidity (i.e., low viscosity) at higher shear rates. Moreover, the suitability of such compositions for such use is also further enhanced due to the fact that papers coated with such compositions have excellent water resistance as well as exhibiting an excellent combination of other desirable paper coating characteristics such as coating brightness, pre-printing gloss (i.e., paper gloss), post-printing gloss (i.e., ink gloss), smoothness and the like.

DETAILED DESCRIPTION OF THE INVENTION

The paper coating compositions of the present invention employ as a binder component therein a particular type of alkali-sensitive synthetic copolymer latex which is prepared by emulsion polymerizing a certain comonomer charge (i.e., a comonomer charge of a type which—when copolymerized alone—forms an alkali-swellable or alkali-soluble copolymer) in the presence of a preformed copolymer latex comprising, in polymerized form, a monovinylidene aromatic monomer, an open-chain aliphatic conjugated diene and optionally, but preferably, an ethylenically unsaturated carboxylic acid monomer.

By the term "monovinylidene aromatic monomer", it is intended to include those monomers wherein a substituent of the formula

(wherein R is hydrogen or a lower alkyl such as an alkyl having from 1 to 4 carbon atoms) is attached directly to an aromatic nucleus containing from 6 to 10 carbon atoms, including those wherein the aromatic nucleus is substituted with alkyl or halogen substituents. Typical of these monomers are styrene, α-methylstyrene, ortho-, meta-, and para-methylstyrene, ortho-, meta- and para-ethylstyrene, o,p-dimethylstyrene, o,p-diethylstyrene, isopropylstyrene, o-methyl-p-isopropylstyrene, p-chlorostyrene, p-bromostyrene, o,p-dichlorostyrene, o,p-dibromostyrene, vinylnaphthalene, diverse vinyl (alkyl naphthalenes) and vinyl (halonaphthalenes), and comonomeric mixtures thereof. Because of considerations such as cost, availability, ease of use, etc., styrene and vinyltoluene are preferred and styrene is especially preferred as the monovinylidene aromatic monomer. The amount of such monovinylidene aromatic monomer employed in the aforementioned preformed latex is not particularly critical. However, as a general rule, such monomer typically constitutes from about 10 to about 90 (preferably from about 25 to about 70 and most preferably 35 to about 65) weight percent of the aforementioned preformed copolymer latex which is employed in the practice of this invention.

By the term "open-chain aliphatic conjugated diene" it is meant to include open-chain aliphatic conjugated dienes which are copolymerizable with the aforementioned monovinylidene aromatic monomers. Typical of such dienes are those having from 4 to about 9 carbon atoms such as 1,3-butadiene, 2-methyl-1,3-butadiene, 2,3-dimethyl-1,3-butadiene, pentadiene, 2-neopentyl-1,3-butadiene; other hydrocarbon analogs of 1,2-butadiene; the substituted 1,2-butadienes such s 2-chloro-1,3-butadiene, 2-cyano-1,3-butadiene; the substituted straight chain conjugated pentadienes; the straight chain and branched chain conjungated hexadienes; other straight and branched chain conjugated dienes having from 4 to about 9 carbon atoms, comonomeric mixtures of the foregoing and the like. The 1,3-butadiene hydrocarbon monomers such as those mentioned hereinbefore provide interpolymers having particularly desirable properties and are therefore preferred. The cost, ready availability and the excellent properties of interpolymers produced therefrom makes 1,3-butadiene the most preferred open-chain aliphatic conjugated diene.

The amount of the aforementioned open-chain aliphatic conjugated dienes employed in the above-noted preformed copolymer latex is not particularly critical so long as it is sufficient to provide the desired binding strength to paper coatings prepared from the coating compositions of the invention. Typically, the presence of as little as about 10 weight percent of such conjugated diene in the preformed copolymer is sufficient for such purpose, particularly where such preformed copolymer constitutes less than about 70 weight percent (especially where 50 weight percent or less) of the ultimate alkali-sensitive latex on a total polymer solids basis. Accordingly, such conjugated diene generally constitutes from about 10 to about 90 weight percent (on a polymer solids basis) of the aforementioned preformed copolymer latex in the practice of the present invention. Preferably—and particularly where the aforementioned preformed copolymer latex constitutes more than about 50 weight percent (especially where more than about 70 weight percent) of the ultimate alkali-sensitive latex on a polymer solids basis—the aforementioned preformed copolymer latex is film forming (i.e., forms a continuous, adherent film or layer) upon drying at ambient temperatures (e.g., at from about 20° to about 25° C.). Accordingly, the above-described conjugated diene preferably constitutes from about 25 to about 70 (most preferably from about 30 to about 60) weight percent of the polymer solids in such preformed copolymer latex for the purpose of ensuring obtention of the desired pigment binding strength for papers coated with the compositions of the instant invention.

The ethylenically unsaturated carboxylic acid which is optionally, but preferably, employed in the aforementioned preformed copolymer latex can vary so long as such acids are copolymerizable with the above-described monovinylidene aromatic and open-chain aliphatic conjugated diene monomers. Typical examples of such ethylenically unsaturated carboxylic acid monomers include acrylic acid, methacrylic acid, maleic acid, fumaric acid, itaconic acid, crotonic acid, and the like, and, naturally, combinations of two or more of such acids can also be suitably employed. Preferably, such acid monomer is acrylic or methacrylic acid or mixtures thereof.

As has been noted, the use of the aforementioned ethylenically unsaturated carboxylic acid is optional but preferred in the above-noted preformed copolymer latex. Typically, the amount of such acid which is employed will range from 0 to about 10 weight percent based upon the polymer solids of such preformed copolymer latex depending upon the degree of colloidal stability desired for such preformed latex. Preferably, at least about 0.5 weight percent of such acid monomer is employed based upon the total preformed copolymer solids weight to conveniently ensure satisfactory stability in the polymerization of such copolymer latex. However, if more than about 10 weight percent of such acid monomer is employed, the viscosity of the resulting preformed copolymer latex may be increased to unsatisfactory or undesirable levels. Accordingly, such acid monomer is preferably employed in the indicated preformed copolymer latex at a level of from about 0.5 to about 10 (more preferably from about 1 to about 10 and most preferably from about 2 to about 5) weight percent based upon the polymer solids weight of such preformed copolymer latex.

In addition to the above-described monovinylidene aromatic, open-chain aliphatic conjugated diene and ethylenically unsaturated carboxylic acid monomers, the preformed copolymer latex employed in the practice of this invention can also optionally contain other copolymerizable monomers. Suitable such other optional monomers include, for example, esters of the aforementioned ethylenically unsaturated carboxylic acids such as hydroxyalkyl acrylates or methacrylates (e.g., wherein the alkyl group contains from 2 to about 4 carbon atoms such as 2-hydroxyethyl acrylate, 3-hydroxypropyl acrylate, 2-hydroxyethyl methcrylate, etc.); alkyl acrylates or alkyl methacrylates (e.g., wherein the alkyl group contains from 1 to about 18 carbon atoms such as methyl acrylate, ethyl acrylate, propyl acrylate, methyl methacrylate, ethyl methacrylate, n-butyl, isobutyl or sec-butyl acrylate or methacrylate, n-propyl or isopropyl acrylate or methacrylate, 2-ethylhexyl acrylate, etc.); and the like and, naturally, such optional monomers can be used individually or in combinations of two or more.

As noted, the above-described other copolymerizable monomers are also optional in the aforementioned preformed copolymer latex and, accordingly, the amount of any such optional monomer employed is not critical to the practice of the present invention. However, as a general rule, such monomer is typically employed, if at all, in the aforementioned preformed copolymer latex in the range of from 0 to about 30 (preferably from about 5 to about 30 and most preferably from about 10 to about 25) weight percent based upon the polymer solids of such preformed copolymer latex.

In the practice of the present invention, the alkali-sensitive polymer latex employed is prepared by emulsion copolymerizing—in the presence of the above-described preformed copolymer latex—a monomer charge comprising from about 10 to about 60 (preferably from about 15 to about 50) weight percent of an ethylenically unsaturated carboxylic acid monomer and from about 40 to about 90 (preferably from about 50 to about 85) weight percent of a copolymerizable unsaturated monoolefin compound, both being based upon the total weight of such monomer charge.

Ethylenically unsaturated carboxylic acids suitable for use in the foregoing monomer charge include those hereinbefore described for use in the preformed copolymer latex. Thus, examples of suitable such acids include acrylic acid, methacrylic acid, maleic acid, fumaric acid, crotonic acid, cinnamic acid and the like and, naturally, it is possible to use such acids singly or in combinations of two or more. Preferably, the aforementioned ethylenically unsaturated carboxylic acid is acrylic or methacrylic acid or mixtures thereof.

The exact amount of the above-described ethylenically unsaturated acid monomer employed in the aforementioned monomer charge can vary widely within the above-indicated general limits. However, in the even that such acid monomer constitutes less than about 10 weight percent of such monomer charge, the desired level of alkali sensitivity of the coating composition employing the resulting latex is not generally obtained and the desired levels of whiteness and pre- and post-printing gloss are generally not obtained for the ultimate coated paper article made using such paper coating compositions. Conversely, in the event that the acid monomer constitutes more than about 60 weight percent of the indicated monomer charge, the alkali sensitivity and viscosity of the resulting coating compositions are generally unacceptably high and the water resistance of the ultimate paper coating is generally undesirbly low.

The unsaturated monoolefin compound to be copolymerized with the above-described acid monomer in the aforementioned monomer charge can be any monoethylenically unsaturated monomer which is copolymerizable with such ethylenically unsaturated carboxylic acid monomers. Examples of suitable such copolymerizable ethylenically unsaturated monomers thus include the hereinbefore described monovinylidene aromatic monomers (e.g., styrene, α-chlorostyrene, vinyltoluene, etc.); acrylonitrile; methacrylonitrile; acrylamide; methacrylamide; vinyl esters of saturated aliphatic carboxylic acids (e.g., vinyl acetate, vinyl formate, vinyl propionate, etc.); vinyl chloride; vinylidene chloride; vinyl ethers (e.g., vinyl methyl ether, vinyl ethyl ether, etc.); vinyl pyridine; esters of saturated aliphatic or aromatic alcohols (preferably $C_1$ to about $C_8$ alkanols) with ethylenically unsaturated carboxylic acids (e.g., methyl acrylate, ethyl acrylate, methyl methacrylate, ethyl methacrylate, n-butyl acrylate, n-propyl acrylate, isobutyl acrylate, isopropyl acrylate, sec-butyl acrylate, tert-butyl acrylate, amyl acrylate, isoamyl acrylate, hexyl acrylate, heptyl acrylate, octyl acrylate, nonyl acrylate, 2-ethylhexyl acrylate, 2-hydroxyethyl acrylate, 3-hydroxypropyl acrylate, dodecyl acrylate, cyclohexyl acrylate, phenyl acrylate, glycidyl acrylate, n-propyl methacrylate, isopropyl methacrylate, n-butyl methacrylate, isobutyl methacrylate, sec-butyl methacrylate, tert-butyl methacrylate, amyl methcrylate, isoamyl methacrylate, hexyl methacrylate, heptyl methacrylate, octyl methacrylate, glycidyl methacrylate, the diethyl ester of maleic acid, the diethyl ester of itaconic acid, the diethyl ester of fumaric acid, etc.) and the like. Naturally, such compounds can be used individually or in combination of two or more. Of the foregoing suitable monoolefin compounds, the above-described saturated aliphatic or aromatic alcohol esters of ethylenically unsaturated carboxylic acids (especially acrylic or methacrylic acid) are preferred for use in the above-noted monomer charge.

In accordance with the present invention, the weight ratio of the polymer solids of the above-described preformed monovinylidene aromatic/open-chain aliphatic conjugated diene copolymer latex to the above-described ethylenically unsaturated carboxylic acid/-monoolefin monomer charge is generally in the range between about 10 parts polymer solids:90 parts monomer and about 90 parts polymer solids:10 parts monomer and is preferably between about 50 parts polymer solids:50 parts monomer and about 85 parts polymer solids:15 parts monomer. In the event that the above-indicated ratio is below about 10:90, the water resistance of paper coatings employing such latex is undesirably lowered. On the other hand, when such ratio is above about 90:10, the low shear viscosity of the coating compositions employing such a latex is generally undesirably low and, in addition, the desired levels of brightness and gloss is not generally obtained for coated papers employing such compositions.

The alkali-sensitive coplymer latexes employed in the practice of this invention can be manufactured batchwise, semi-batchwise or continuously by conventional emulsion polymerization techniques, typically employing polymerization temperatures in the range of from about 30° C. to about 100° C. In such polymerization, the above-described preformed copolymer latex can be prepared in an emulsion polymerization step which is totally separate and distinct from the emulsion polymerization of the above-described monomer chage. Indeed, such preformed copolymer latex can, if desired, be a completely finished latex prepared long in advance of the emulsion polymerization of such latex monomer charge and, thus, can be any suitable commercially available latex such as, for example, the various commercially available carboxylated styrene-butadiene copolymer latexes and the like. Alternatively, and preferably, the above-described preformed copolymer latex is formed in situ prior to (e.g., essentially immediately in advance of) the polymerization of the above-described monomer charge and, in such event, the resulting polymerization process is essentially a conventional sequential or staged emulsion polymerization. (See, for example, U.S. Pat. No. 3,256,233 and, in particular, see the preparation of Latex B thereof.)

When the aforementioned sequential or staged polymerization approach is employed in preparing the alkali-sensitive copolymer latex of the invention, the above-described preformed monovinylidene aromatic-/open-chain aliphatic conjugated diene copolymer latex is initially prepared in a first polymerization step pursuant to conventional emulsion copolymerization techniques. Then, when the degree of conversion of monomer to polymer in such first polymerization step has reached the desired level, a second polymerization step is performed wherein the above-described monomer charge (i.e., comprising an ethylenically unsaturated carboxylic aciid and a copolymerizable monoolefin unsaturated compound) is added to (and polymerized in the presence of) the copolymer latex product of such first polymerization step. When such a sequential or staged polymerization is employed, it is generally desirable—particularly where the preformed copolymer latex constitutes about 50 weight percent or more (especially where more than about 60 weight percent or more) of the ultimate alkali-sensitive copolymer latex on a polymer solids basis—that the above-described second polymerization step or stage not be initiated until the initial polymerization has achieved about a 90 percent conversion of the first stage monomer charge. Otherwise, satisfactory alkali sensitivity of the resulting latex may not be obtained and paper coated with coating compositions employing the resulting latex may lack the desired level of brightness and water resistance.

Regardless of the method chosen for preparing the above-described alkali-sensitive latex (e.g., by sequential or staged approach or by a separate and distinct post-treatment or grafting approach with a much earlier formed copolymer latex), the individual emulsion polymerization step or steps themselves are conducted pursuant to conventional emulsion polymerization techniques by employing an emulsifier and a polymerization initiator (and, if desired, a chain transfer agent) in an aqueous medium. Generally, as the emulsifier, anionic and nonionic surface active agents are employed. Examples of suitable anionic surface active agents include those normally employed in the manufacture of styrene-butadiene copolymer latexes and carboxylated styrene-butadiene copolymer latexes such as sulfuric acid esters of higher aliphatic alcohols, alkylbenzene sulfonates, various aliphatic sulfonates and the like. As examples of suitable nonionic surface active agents, the alkyl esters, alkyl ethers and alkyl phenyl ethers of polyalkylene glycols such as polyethylene glycol, etc., can be enumerated. As the initiator, any conventional initiator can be used such as water-soluble initiators (e.g., sodium persulfate, potassium persulfate, ammonium persulfate, etc.); oil-soluble initiators (e.g., benzoyl persulfate, etc.); or redox type initiator systems. As the chain transfer agent, any of the well-known emulsion polymerization chain transfer agents can be employed such as, for example, bromoform, carbon tetrachloride, t-dodecylmercaptan and the like. Moreover, in addition to the foregoing ingredients, other conventional emulsion polymerization ingredients such as chelating agents (e.g., tetrasodium pyrophosphate, ethylenediaminetetraacetic acid, etc.), various inorganic salts, and the like can, if desired, also be employed in the normal fashion.

The final particle size of the alkali sensitive copolymer latex employed in the paper coating grade composition of this invention is generally in the range of about 0.1 micron to about 1 micron and is preferably in the range of from about 0.1 to about 0.5 micron. When the particle size is larger than about 1 micron, adhesiveness is undesirably lowered, while if the size is smaller than about 0.1 micron, the desired fluidity of the paper coating grade composition is not generally obtained.

The above-described alkali-sensitive copolymer latex is generally employed in the coating compositions of the invention in an amount ranging from about 3 to about 30 (preferably from about 5 to about 25) parts by weight on a polymer solids basis per 100 parts by weight of the pigment. In case less than about 3 parts by weight is employed, the adhesiveness (or pigment binding strength) is generally undesirably low. On the other hand, if more than about 30 parts by weight are employed, "blocking" may occur wherein paper surfaces coated with such composition stick together when contacted with each other and, furthermore, the resulting coated papers may also stick to metal roll surfaces during finishing processes such as super calendering, gloss calendering, etc. Such sticking problems are, of course, undesirable.

As the pigment to be used in the paper coating grade composition of this invention, any type of ordinary pigments (e.g., mineral pigments, plastic pigments and the like) which are conventionally used for coating of paper can be employed and, for example, clay, talc, satin white, calcium bicarbonate, precipitated calcium carbonate, titanium dioxide, zinc oxide, aluminum hydroxide and barium sulfate can be enumerated, but the suitable pigments are naturally not limited to those particular compounds.

In addition to the above-described alkali-sensitive copolymer latex and paper coating pigments, the paper coating compositions of the invention can also contain other conventionally employed paper coating ingredients such as, for example, water resisting agents (e.g., urea resins, melamine resins, etc.); pigment dispersing agents (e.g., sodium pyrophosphate, sodium hexametaphosphate, sodium polyacrylate, etc.); antifoaming agents; release agents; preservatives (e.g., fungicides, biocides, etc.) and the like.

In using the paper coating compositions of the invention, the pH of such composition is adjusted into the alkaline range (e.g., a pH of from about 7.5 to about 13, preferably from about 9 to about 11) at some point in advance of its application to (i.e., its being coated into) the paper substrate to be coated therewith. In making such pH adjustment, any convenient alkaline materials can be employed such as, for example, ammonia, aqueous solutions of common basis such as ammonium hydroxide, sodium hydroxide, potassium hydroxide, etc., and the like and, naturally, the amount of such material employed is not critical so long as it is sufficient to provide the paper coating composition with a pH in the above-described alkaline range.

In formulating or preparing the paper coating compositions of the invention, the above-described ingredients thereof can be combined in any convenient conventional fashion employing conventional mixing equipment such as a KD mill, homogenizers, and the like. In such operation, the coating compositions of the invention are prepared to have total solids contents in the normal or conventionally employed range; namely, generally in the range of from about 30 to about 65 weight percent based upon the total coating composition weight. Similarly, said compositions can be coated onto the paper substrates to be coated therewith also by the conventional paper coating techniques such as, for example, air knife coating, blade coating, roll coating, size press coating, bar coating and the like. In addition, in the event that the coating is carried out two or more times on one side of the paper (e.g., both times by a blade, one by a blade and another time by an air knife, etc.) the composition of this invention can be employed as all of such multiple coats or conventional compositions can form some of such multiple coats. Furthermore, the coating can be achieved on the one side or both sides of the paper (and, again one or more coating layers using the instant compositions can be employed with or without coatings of conventional coating compositions).

The amount of coating is preferably in the range of 2 to 30 g/m$^2$ per surface (i.e., from about 1.66 to about 20 lbs/3300 square foot of coated surface) on a dry basis. Naturally, after drying, the paper can be treated, if desired, in the normal fashion with conventional finishing equipment such as super calender, gloss calender, as well as with any of the well-known other processing means of the paper coating industry.

Additional details of this invention will be apparent from the following examples, but the scope of this invention is not to be understood as being limited to such examples. In addition, in the following examples all parts and percentages are to be understood as being on a weight basis unless otherwise specified.

EXAMPLE 1

To a pressure reactor equipped with a stirrer is added 70 parts of water, 0.2 part of a seed latex having an average particle size of about 250 Angstroms (styrene/acrylic acid copolymer latex consisting of styrene 96% and acrylic acid 4%), 0.1 part of sodium dodecylbenzene sulfonate and 0.05 part of sodium ethylenediaminetetraacetate to obtain a mixture, which is heated to 90° C. After the air within the reactor is substituted with nitrogen, the internal pressure of the reactor is reduced and a mixture comprising 27 parts of styrene, 27 parts of butadiene, 10 parts of methyl methacrylate, 2 parts of acrylic acid and 0.2 part of t-dodecylmercaptan, and a mixture comprising 50 parts of water, 0.1 part of sodium dodecylbenzene sulfonate, 0.15 part of sodium hydroxide, and 0.5 part of potassium persulfate are added gradually to the reactor over a period of 6 hours. The aqueous dispersion thus obtained has dispersed particles having an average size of 1700 Angstroms, a pH of 4.0 and is found to have a 99.0% conversion of the initially charged monomer to polymer. Next, a mixture comprising 17 parts of methyl methacrylate and 17 parts of acrylic acid and an aqueous mixture comprising 34 parts of water, 0.05 part of sodium dodecylbenzene sulfonate and 0.2 part of potassium persulfate are gradually added to the previously obtained aqueous dispersion over a period of about 3 hours. The resulting aqueous dispersion contains dispersed polymer particles having an average particle size of about 2000 Angstroms, has a pH of about 2.5 and is found to have a 99.5% conversion of the total monomer charged to polymer. Twenty parts of the foregoing aqueous dispersion (i.e., Latex A), 90 parts of premium grade clay, 10 parts of Hakuenka brand precipitated calcium carbonate (manufactured by Shiraishi Industry Co., Ltd.), 0.2 part of dispersing agent, Aron T-40 (manufactured by Toa Synthetic Chemical Co., Ltd.), water and aqueous ammonia are homogeneously mixed and adjusted in hydrogen ion concentration to pH 10.0 to obtain a paper coating grade composition (i.e., Composition 1) whose solid content is 55 percent. The viscosity of the composition is 2500 cps at 60 rpm. Composition 1 is then coated on one side of paper of fine quality weighing 75 g/m$^2$ with a wire-wound rod to provide a coating weight on a dry weight basis. The resulting coated paper is then placed into a hot air oven at 100° C. for 30 seconds; supercalendered twice at 50° C. and under 100 kg/cm pressure; and is then placed in a thermostatic chamber kept at 20° C. and a relative humidity of 65 percent. The viscosity behavior of Composition 1 and the physical property test results of the paper coated with such composition are shown in Table I.

As is apparent from Table I, the paper coating grade composition of this example (i.e., Composition 1) has satisfactorily high viscosity at lower shear rates and good fluidity at higher shear rates, and the paper coated with Composition 1 has excellent brightness and water resistance.

EXAMPLE 2

The polymerization procedure of Example 1 is repeated except that, in the first polymerization stage, 2 parts of methacrylic acid is substituted for the corresponding 2 parts of acrylic acid of Example 1 and 0.3 part of t-dodecylmercaptan is employed therein rather than 0.2 part as was the case in Example 1. In addition, in the second polymerization stage 17 parts of methacrylic acid is substituted for the corresponding 17 parts of acrylic acid in the second stage of Example 1.

The aqueous dispersion thereby produced (i.e., Latex B) has an average particle size of about 2020 Angstroms and a pH of about 2.6 and the overall conversion of monomer to polymer is found to be about 99 percent.

The foregoing latex (i.e., Latex B) is employed pursuant to the procedure of Example 1 to prepare a paper coating composition (i.e., Composition 2) and the resulting composition is applied to a fine grade paper substrate, again in accordance with the procedures of Example 1. The properties of the resulting coating composition and of the paper coated therewith are summarized in Table I below. As is evident from such results, the paper coating composition of this Example (i.e., Composition 2) has satisfactorily high viscosity at lower shear rates and good fluidity at higher shear rates and the paper coated with such composition has excellent brightness and water resistance.

EXAMPLE 3

The copolymerization of the monomers in this example is achieved according to the same process as in Example 1 by using a feeding device and a pressure reactor equipped with a stirrer to obtain the same carboxylated styrene-butadiene copolymer latex as in Example 1.

Next, a mixture consisting of 30.6 parts of methyl methacrylate and 3.4 parts of acrylic acid, and an aqueous solution consisting of 34 parts of water, 0.05 part of sodium dodecylbenzene sulfonate, and 0.2 part of potassium persulfate are gradually fed to the aforementioned carboxylated styrene-butadiene copolymer latex and polymerized therein at 90° C. over a period of about 3 hours. The aqueous dispersion thereby obtained (i.e., Latex C) has an average particle size of about 2000 Angstroms, a pH of about 3.8 and the degree of conversion of monomer to polymer is about 99.0 percent.

Twenty parts of the resulting aqueous dispersion (i.e., Latex C) is used to prepare paper coating grade composition (i.e., Composition 3) according to the same process as in Example 1 and the viscosity of such composition is about 2380 cps at 60 rpm.

The composition is then applied to the above-noted quality paper in the same fashion as in Example 1 and the drying and supercalendering operations of Example 1 are repeated. The viscosity behavior of Composition 3 and the physical property test results of the paper coated with such composition are shown in Table I.

As is apparent from Table I, the paper coating grade composition of this example (i.e., Composition 3) had satisfactorily high viscosity at lower shear rates (i.e., 60 rpm) and desirable fluidity (i.e., desirably low viscosity) at higher shear rates (i.e., 4400 rpm) and the paper coated with such composition had excellent brightness and water resistance.

EXAMPLE 4

The first stage carboxylated styrene-butadiene copolymer latex of Example 1 is again prepared according to the process of Example 1 by using a feeding device and a pressure reactor equipped with a stirrer.

Next, a mixture consisting of 13.6 parts of methyl methacrylate and 20.4 parts of acrylic acid and an aqueous solution consisting of 34 parts of water, 0.05 part of sodium dodecylbenzene sulfonate and 0.2 part of potassium persulfate are gradually added to the aforementioned carboxylated styrene-butadiene over a period of about 3 hours. The aqueous dispersion (i.e., Latex D) thereby obtained has an average particle size of 2030 Angstroms, a pH of 2.0 and the overall conversion of monomer to polymer is 99.5%.

By using 20 parts of the resulting aqueous dispersion (i.e., Latex D), a paper coating grade composition (i.e., Composition 4) is prepared in accordance with the procedures of Example 1. The viscosity of the resulting composition is 2720 cps at 60 rpm.

The composition is then applied to a fine quality paper substrate as in Example 1 and the physical properties of the resulting coated paper are determined as in Example 1. The viscosity behavior of Composition 4 and the physical property test results of the paper coated with such composition are summarized in Table 1.

As is seen in Table 1, the viscosity behavior of the paper coating grade composition of this example (i.e., Composition 4) is quite satisfactory and the brightness and water resistance of the coated paper employing such composition are excellent.

EXAMPLE 5

Fifty-four parts of water is supplied to a pressure reactor equipped with a stirrer. Thereafter, 0.2 part of the same seed latex as in Example 1, 0.1 part of sodium dodecylbenzene sulfonate, and 0.05 part of sodium ethylenediaminetetraacetate is added thereto and the resulting mixture is heated to 90° C. Then the air within the reactor is displaced by nitrogen, the internal pressure of the reactor is reduced and a mixture consisting of 4.5 parts of styrene, 4.5 parts of butadiene, 0.5 part of acrylic acid and 0.05 part of t-dodecylmercaptan and an aqueous solution consisting of 10 parts of water, 0.1 part of sodium dodecylbenzene sulfonate, 0.03 part of sodium hydroxide and 0.1 part of potassium persulfate are gradually added over a period of 2 hours. The aqueous carboxylated styrene-butadiene polymer dispersion thereby obtained has an average particle size of 950 Angstroms and a pH of 4.0 and conversion of the above added monomer to polymer is greater than 99.0%. Subsequently, a mixture consisting of 60 parts of methyl methacrylate and 30 parts of acrylic acid and an aqueous solution consisting of 90 parts of water, 0.05 part of sodium dodecylbenzene sulfonate and 0.5 part of potassium persulfate are gradually added to the foregoing carboxylated styrene-butadiene copolymer dispersion over a period of 6 hours. The resulting aqueous dispersion (i.e., Latex E) has an average particle size of 2050 Angstroms and a pH of 1.8 and the overall conversion of monomer to polymer is 99.0%.

By using 20 parts of the foregoing aqueous dispersion (i.e., Latex E), another paper coating grade composition of the invention (i.e., Composition 5) is prepared according to the procedure of Example 1. The viscosity of the resulting composition is 2930 cps at 60 rpm.

Composition 5 is then coated onto a fine grade paper substrate in the same manner as in Example 1 and the physical properties of the resulting coated paper are also determined as in Example 1. The viscosity behavior of Composition 5 and the physical property test results of the paper coated with such composition are shown in Table 1.

As is evident from Table 1, the high shear and low shear viscosity behavior of Composition 5 is quite satisfactory and the brightness and the water resistance of the coated paper are also excellent.

EXAMPLE 6

Seventy-four parts of water are fed to a pressure reactor equipped with a stirrer and then 0.2 part of the same seed latex as used in Example 1, 0.1 part of sodium dodecylbenzene sulfonate and 0.05 part of sodium ethylenediaminetetraacetate are added thereto. The resulting mixture is then heated to 90° C. and the air within the vessel is displaced by nitrogen. The internal pressure of the vessel is then reduced and a mixture consisting of 39 parts of styrene, 39 parts of butadiene, 10 parts of methyl methacrylate, 2 parts of acrylic acid and 0.4 part of t-dodecylmercaptan and an aqueous solution consisting of 70 parts of water, 0.1 part of sodium dodecylbenzene sulfonate, 0.15 part of sodium hydroxide and 0.5 part of potassium persulfate are gradually added over a period of 6 hours. At the end of that time period, an aqueous copolymer dispersion is obtained having average particle size of 1900 Angstroms, a pH of 4.5 and a conversion of monomer to polymer of 99.0%. A mixture consisting of 5 parts of methyl methacrylate and 5 parts of acrylic acid and an aqueous solution consisting of 10 parts of water, 0.05 part of sodium dodecylbenzene sulfonate and 0.1 part of potassium persulfate are then gradually added to the above-prepared aqueous copolymer dispersion over a period of 1 hour. The aqueous polymer dispersion thereby obtained (i.e., Latex F) has an average particle size of 1900 Angstroms, a pH of 3.8 and degree of conversion of monomer to polymer of 99.2%.

By using 20 parts of Latex F, a paper coating grade composition (i.e., Composition 6) is prepared in accordance with the procedures of Example 1. The viscosity of the resulting composition is 2300 cps at 60 rpm.

Composition 6 is then coated onto the fine grade paper of Example 1, again pursuant to the Example 1 coating procedures and physical property testing is performed on the resulting coated paper substrate. The viscosity behavior and the physical property test results of Composition 6 are shown in Table 1.

As is seen in Table 1, the viscosity behavior of Composition 6 is quite good and the brightness and water resistance properties of the paper coated therewith are excellent.

EXAMPLE 7

Twenty parts of Latex A from Example 1, 50 parts of premium grade clay, 40 parts of Jiikulite clay, 10 parts of Hakuenka brand precipitated calcium carbonate (manufactured by Shiraishi Industry Co., Ltd.), 0.2 part of the dispersing agent Aron T-40 (manufactured by Toa Synthetic Chemical Co., Ltd.), water and aqueous ammonia are mixed until resultant mixture becomes a homogeneous dispersion and the hydrogen ion concentration of such dispersion is adjusted to pH 10.0. The resulting paper coated grade composition (i.e., Composition 7) has a solid content of 55% and the viscosity thereof is 2570 cps at 60 rpm.

Composition 7 is then coated onto fine grade paper stock as in Example 1 and the physical property tests are performed, also as in Example 1. The viscosity behavior of Composition 7 and the physical property test results for the coated paper therewith are shown in Table 1.

As will be obvious from Table 1, the low and high shear viscosity of Composition 7 is excellent and the brightness and the water resistance properties of the paper coated therewith are also excellent.

COMPARATIVE EXAMPLE 1

First Stage Conversion Less Than 90 Percent

A carboxylated styrene-butadiene-methyl methacrylate copolymer latex is prepared generally according to the corresponding polymerization step of Example 1 except that when the degree of conversion of the monomer charge to polymer reaches 80%, a mixture consisting of 17 parts of methyl methacrylate and 17 parts of acrylic acid (i.e., corresponding to the second monomer charge of Example 1) and the corresponding aqueous solution of Example 1 are added over a 3 hour period according to the procedures of Example 1. The aqueous dispersion thereby obtained (i.e., Latex G) has an average particle size of 1940 Angstroms, a pH of 2.5 and degree of conversion of monomer to polymer is 97.5%.

By using 20 parts of Latex G, a comparative paper coating grade composition (i.e., Composition 8) is prepared according to the procedures of Example 1 and the viscosity of such composition is 2520 cps at 60 rpm.

The resulting composition (i.e., Composition 8) is coated onto a fine grade paper as in Example 1 and the physical property tests are performed on such coated paper. The viscosity behavior and the physical property test results thus obtained are shown in Table 1.

As is apparent from Table 1, the paper coated with Composition 8 was inferior to that coated with the paper coating composition of the instant invention in terms of both brightness and water resistance.

COMPARATIVE EXAMPLE 2

Single Stage Polymerization

Seventy parts of water are supplied to a pressure polymerization vessel equipped with a stirrer. Thereafter, 0.2 part of the seed latex of Example 1, 0.1 part of sodium dodecylbenzene sulfonate, 0.05 part of sodium ethylenediaminetetraacetate are also supplied to the polymerization vessel and the resulting mixture is then heated to 90° C. After the internal air of the vessel is replaced by nitrogen, the internal pressure of the reactor is reduced and a monomer mixture consisting of 27 parts of styrene, 27 parts of butadiene, 27 parts of methyl methacrylate, 19 parts of acrylic acid and 0.3 part of t-dodecylmercaptan and an aqueous solution consisting of 84 parts of water, 0.15 part of sodium hydroxide and 0.6 part of potassium persulfate are gradually added to the vessel over a 6-hour period. The aqueous polymer dispersion thereby obtained (i.e., Latex H) has an average particle size of 2050 Angstroms, a pH of 2.5 and the degree of conversion of monomer to polymer is 98.0%.

By using 20 parts of Latex H, a comparative coating grade composition (i.e., Composition 9) is prepared according to the procedures of Example 1 and the viscosity of such composition is found to be 1880 cps at 60 rpm.

Composition 9 is then coated onto a paper substrate as in Example 1 and physical property tests are performed on the resulting coated paper as well as on the coating composition itself. The viscosity behavior and the physical property test results thereby obtained are shown in Table 1. As will be apparent from such results, the comparative composition of this example (i.e., Composition 9) has lower shear rates (i.e., 60 rpm) relative to that of the coating compositions of the present invention and, in addition, such comparative composition also is inferior in fluidity at higher shear rates (e.g., at 4400 rpm) relative to the compositions of the present invention. Finally, it is also noted that the brightness of the paper coated with Composition 9 was also notably inferior to that of the paper coated with the various paper coating grade compositions of the instant invention.

COMPARATIVE EXAMPLE 3

Physical Blend of Two Distinct Copolymer Latexes

Thirty-four parts of water, 0.2 part of potassium persulfate and 0.1 part of sodium dodecylbenzene sulfonate are supplied to a pressure reactor equipped with a stirrer and a monomer mixture containing 17 parts of methyl methacrylate and 17 parts of acrylic acid is added thereto. The air within the vessel is then displaced with nitrogen and the resulting mixture is heated to 90° C. for 3 hours to obtain an aqueous dispersion designated herein as Latex I. Latex I and the carboxylated styrene-butadiene copolymer latex prepared in accordance with the first polymerization step of Example 1 were admixed to yield an aqueous dispersion blend which is designated herein as Latex J.

By using 20 parts of the foregoing blended aqueous dispersion (i.e., Latex J), a comparative paper coating grade composition (i.e., Composition 10) is prepared according to the procedure of Example 1. The viscosity of the resulting coating composition is 2450 cps at 60 rpm.

Composition 10 is then coated on a paper as in Example 1 and the corresponding physical property tests are performed thereon. The viscosity behavior and the physical property test results for Composition 10 (and for the paper coated therewith) are shown in Table 1.

As is evident from Table 1, the paper coated with Composition 10 is inferior to that coated with the composition of this invention in terms of both water resistance and brightness.

COMPARATIVE EXAMPLE 4

Staged Latex Having Less Than 10 Percent Ethylenically Unsaturated Carboxylic Acid Monomer in the Second Stage Monomer Charge A carboxylated styrene-butadiene-methyl methacrylate copolymer latex is prepared according to the recipe and the process of Example 1. Thereafter, a second stage monomer mixture consisting of 32 parts of methyl methacrylate and 2 parts of acrylic acid and an aqueous solution consisting of 34 parts of water, 0.05 part of sodium dodecylbenzene sulfonate and 0.2 part of potassium persulfate are gradually added to the foregoing carboxylated styrene-butadiene-methyl methacrylate latex over a period of 3 hours. The aqueous dispersion thereby obtained (i.e., Latex K) has an average particle size of 2000 Angstroms and a pH of 4.0 and the degree of conversion of monomer to polymer therein is 99.0%.

By using 20 parts of Latex K, another comparative paper coating grade composition (i.e., Composition 11) is prepared according to the procedures of Example 1. The viscosity of the resulting composition is 1760 cps at 60 rpm.

The foregoing comparative composition is then coated on a paper substrate as in Example 1 and the corresponding physical property tests of Example 1 are performed on the resulting coated paper. The viscosity behavior and the physical property that results for Composition 11 and for the paper coated therewith are shown in Table 1.

As can be seen from Table 1, Composition 11 has unacceptably low viscosity and lower shear rates (i.e., at 60 rpm) and the paper coated with such composition is inferior to paper coated with the various compositions of the present invention in terms of brightness as well as in terms of pre-printing and post-printing gloss.

COMPARATIVE EXAMPLE 5

Staged Latex Having Greater Than 60 Percent Ethylenically Unsaturated Carboxylated Acid Monomer in the Second Stage Monomer Charge A mixture consisting of 9 parts of methyl methacrylate and 25 parts of acrylic acid and an aqueous solution consisting of 34 parts of water, 0.05 part of sodium dodecylbenzene sulfonate and 0.2 part of potassium persulfate are gradually added to 66 parts (dry solids basis) of the carboxylated styrene-butadiene-methyl methacrylate copolymer latex of the first polymerization step of Example 1 over a period of 3 hours. The aqueous polymer dispersion thus obtained (i.e., Latex L) has an average particle size of 2030 Angstroms and a pH of 1.8 and the overall conversion of monomer to polymer is 99.0%.

Using 20 parts of the foregoing aqueous dispersion (i.e., Latex L), a comparative coating grade composition (i.e., Composition 12) is prepared according to the procedure of Example 1. The viscosity of the composition is 3510 cps at 60 rpm.

Composition 12 is then coated onto a paper substrate as in Example 1 and the corresponding physical property tests of Example 1 are performed on the resulting coated paper. The viscosity behavior and the physical property tests results for Composition 12 and for the paper coated therewith are shown in Table 1. As can be seen from such results, the comparative composition (i.e., Composition 12) is not desirable in view of its excessively high apparent viscosity at low shear rates (e.g., at 60 rpm). Also, the paper coated with Composition 12 has inferior water resistance relative to paper coated with the various paper coating grade compositions of the present invention.

COMPARATIVE EXAMPLE 6

Staged Latex Wherein the First Stage Copolymer Constitutes Less than 10 Percent of the Total Latex Solids Water, sodium dodecylbenzene sulfonate, ethylenediaminetetraacetate are supplied to a pressure reactor equipped with a stirrer as in Example 5. The air within the vessel is then replaced by nitrogen and the internal pressure of the reactor is reduced. Then, a mixture consisting of 3.6 parts of styrene, 3.6 parts of butadiene, 0.8 part of acrylic acid and 0.05 part of t-dodecylmercaptan and an aqueous solution consisting of 10 parts of water, 0.1 part of sodium dodecylbenzene sulfonate, 0.03 part of sodium hydroxide and 0.1 part of potassium persulfate are gradually added over a 2-hour period. Subsequently, a mixture consisting of 60 parts of methyl methacrylate and 32 parts of acrylic acid and an aqueous solution consisting of 90 parts of water, 0.05 part of sodium dodecylbenzene sulfonate and 0.5 part of potassium persulfate are gradually added to the resultant aqueous styrene-butadiene-acrylic acid copolymer dispersion over a period of 6 hours. The aqueous dispersion thereby obtained (i.e., Latex M) has an average particle size of 2030 Angstroms and a pH of 1.8 and the degree of conversion of monomer to polymer therein is 98.5%.

Using 20 parts of the foregoing aqueous dispersion (i.e., Latex M) a comparative paper coating grade composition (i.e., Composition 13) is prepared according to the procedures of Example 1. The viscosity of the resulting composition is 3090 cps at 60 rpm.

Composition 13 is then coated on a paper substrate as in Example 1 and the physical property tests of Example 1 are performed thereon. The viscosity behavior and the physical property test results for Composition 13 and for the paper coated therewith are shown in Table 1. As can be seen from such results, the paper coated with Composition 13 has inferior water resistance relative to that of paper coated with the various paper coating grade compositions of the instant invention.

COMPARATIVE EXAMPLE 7

Staged Latex Wherein the First Stage Copolymer Constitutes Greater than 90 Percent of the Total Latex Solids Water, sodium dodecylbenzene sulfonate and ethylenediaminetetraacetate are supplied to a pressure reactor equipped with a stirrer as in Example 6. The air within the vessel is then completely substituted with nitrogen and the internal pressure of the vessel is reduced. Then, a mixture consisting of 41 parts of styrene, 41 parts of butadiene, 10 parts of methyl methacrylate, 2 parts of acrylic acid and 0.4 part of t-dodecylmercaptan and an aqueous solution consisting of 70 parts of water, 0.1 part of sodium dodecylbenzene sulfonate, 0.15 part of sodium hydroxide and 0.5 part of potassium persulfate are gradually added and polymerized at 90° C. over a 6-hour period. The aqueous copolymer dispersion thereby obtained has an average particle size of 1940 Angstroms and a pH of 4.5 and the degree of conversion monomer to polymer is 99.4%.

To the foregoing copolymer dispersion, a mixture consisting of 3 parts of methyl methacrylate and 3 parts of acrylic acid and an aqueous solution consisting of 10 parts of water, 0.05 part of sodium dodecylbenzene sulfonate and 0.1 part of potassium persulfate are gradually added (and polymerized at 90° C.) over a period of one hour. The aqueous polymer dispersion thus prepared (i.e., Latex N) has a pH of 4.1 and the degree of conversion of monomer to polymer therein is 99.4%.

Using 20 parts of the above-prepared Latex N, a comparative paper coating grade composition (i.e., Composition 14) is prepared according to the process and the recipe of Example 1. The viscosity of the composition is 1920 cps at 60 rpm.

Composition 14 is then coated onto a paper substrate as in Example 1 and the physical property tests of Example 1 are performed on the resulting coated paper. The viscosity behavior and the physical property test results of Composition 14 and of the paper coated therewith are shown in Table 1.

As can be seen from Table 1, Composition 14 has unacceptably low viscosity at lower shear rates (i.e., at 60 rpm) and the paper coated with such composition is inferior to the corresponding coated paper employing the various paper coating grade composition of the present invention in terms of the brightness and pre- and post-printing gloss properties thereof.

TABLE 1

| | Polymer Composition | | | | | | | | | | |
|---|---|---|---|---|---|---|---|---|---|---|---|
| | First Stage | | | | | | Second Stage | | | | |
| | St | Bd | MMA | AA | MAA | Total | MMA | AA | MAA | Total | |
| Ex. No. | | | | | | | | | | | |
| 1 | 27 | 27 | 10 | 2 | — | 66 | 17 | 17 | — | 34 | |
| 2 | 27 | 27 | 10 | — | 2 | 66 | 17 | — | 17 | 34 | |
| 3 | 27 | 27 | 10 | 2 | — | 66 | 30.6 | 3.4 | — | 34 | |
| 4 | 27 | 27 | 10 | 2 | — | 66 | 13.6 | 20.4 | — | 34 | |
| 5 | 4.5 | 4.5 | — | 0.5 | — | 9.5 | 60 | 30 | — | 90 | |
| 6 | 39 | 39 | 10 | 2 | — | 90 | 5 | 5 | — | 10 | |
| 7 | 27 | 27 | 10 | 2 | — | 66 | 17 | 17 | — | 34 | |
| Comp. Ex. No. | | | | | | | | | | | Notes |
| 1* | 27 | 27 | 10 | 2 | — | 66 | 17 | 17 | — | 34 | 80% 1st stage conversion |
| 2* | 27 | 27 | 27 | 19 | — | 100 | — | — | — | 0 | Single stage |
| 3* | 27 | 27 | 10 | 2 | — | 66 | 17 | 17 | — | 34 | Blend |
| 4* | 27 | 27 | 10 | 2 | — | 66 | 32 | 2 | — | 34 | Low 2nd stage acid |
| 5* | 27 | 27 | 10 | 2 | — | 66 | 9 | 25 | — | 35 | High 2nd stage acid |
| 6* | 3.6 | 3.6 | — | 0.8 | — | 8 | 60 | 32 | — | 92 | Small 1st stage total |
| 7* | 41 | 41 | 10 | 2 | — | 94 | 3 | 3 | — | 6 | Large 1st stage |

Legend
St = Styrene
Bd = Butadiene
MMA = Methyl Methacrylate
MAA = Methacrylic Acid
AA = Acrylic Acid
*Not an example of the invention.

| | Test Results | | | | | | | | |
|---|---|---|---|---|---|---|---|---|---|
| | Visc. @60 rpm (cps)[1] | Visc. @4400 rpm (cps)[2] | Coated Paper Gloss %[3] | Brightness[4] (%) | Smoothness[5] (Sec.) | Ink Gloss[4] (%) | Dry Pick[6] | Wet Pick[6] | H$_2$O Res.[7] |
| Ex. No. | | | | | | | | | |
| 1 | 2500 | 10 | 56.3 | 87.3 | 780 | 84.2 | 3.0 | 3.0 | V.G. |
| 2 | 2530 | 10 | 56.6 | 87.3 | 786 | 84.3 | 3.0 | 3.0 | V.G. |
| 3 | 2380 | 9 | 54.7 | 86.1 | 676 | 82.7 | 3.0 | 3.0 | V.G. |
| 4 | 2720 | 11 | 56.9 | 87.5 | 792 | 84.6 | 3.0 | 3.0 | V.G. |
| 5 | 2930 | 11 | 56.2 | 87.2 | 758 | 84.3 | 3.0 | 3.0 | V.G. |
| 6 | 2300 | 9 | 54.5 | 86.0 | 693 | 83.7 | 3.0 | 3.0 | V.G. |
| 7 | 2570 | 10 | 56.0 | 87.1 | 774 | 83.8 | 3.0 | 3.0 | V.G. |
| Comp. Ex. No. | | | | | | | | | |
| 1* | 2520 | 10 | 56.1 | 81.2 | 778 | 84.1 | 3.0 | 3.0 | P |
| 2* | 1880 | 18 | 54.3 | 80.6 | 692 | 83.1 | 3.0 | 3.0 | G |
| 3* | 2450 | 10 | 54.6 | 80.7 | 700 | 83.2 | 3.0 | 3.0 | P |
| 4* | 1760 | 11 | 48.8 | 80.3 | 543 | 77.3 | 3.0 | 3.0 | G |
| 5* | 3510 | 14 | 57.0 | 87.2 | 783 | 84.9 | 3.0 | 3.0 | P |
| 6* | 3090 | 13 | 56.8 | 87.4 | 772 | 84.5 | 3.0 | 3.0 | P |

TABLE 1-continued

| 7* | 1920 | 10 | 48.9 | 80.2 | 562 | 80.0 | 3.0 | 3.0 | G |

[1] Brookfield Viscometer @ 60 rpm.
[2] Hercules® HI-SHEAR Viscometer
[3] 75 Murakami Color Glossimeter
[4] Hunter Color and Gloss Meter
[5] Beckman Smoothness Meter
[6] RI Print Tester manufactured by Akashi Mfg. Co., Ltd.
[7] Conventional wet rub test with amount of coating rubbed off sample and onto black paper backing indicating the degree of water resistance. In such test, "V.G." designates very good performance; "G" designates good or acceptable performance; and "P" designates poor or unsatisfactory performance.
*Not an example of the invention.

While the present invention has been described with reference to specific illustrative examples, such examples are not to be understood as limiting the scope of the instantly claimed invention.

What is claimed is:

1. An aqueous paper coating composition comprising and an alkali-sensitive latex wherein said alkali-sensitive latex is a synthetic copolymer latex prepared by emulsion copolymerizing (A) from about 10 to about 90 parts by weight of a monomer mixture comprising, based upon the weight of such monomer mixture, (1) from about 10 to about 60 weight percent of an ethylenically unsaturated carboxylic acid monomer and (2) from about 40 to about 90 weight percent of a copolymerizable monoolefin compound in the presence of (B) from about 10 to about 90 parts by weight, on a polymer solids basis, of a preformed copolymer latex comprising, in polymerized form, (1) a monovinylidene aromatic monomer and (2) an open-chain aliphatic conjugated diene; with the proviso that, if said preformed copolymer latex constitutes about 60 weight percent or more of the said alkali-sensitive copolymer latex on a polymer solids basis, then said preformed copolymer latex either has been copolymerized to a conversion of monomer to polymer therein of at least about 90 weight percent or has been treated for removal of residual monomer therefrom such that a maximum of about 10 weight percent residual monomer resides in said preformed copolymer latex based upon the weight of the polymer solids thereof.

2. The aqueous paper coating composition of claim 1 wherein the preformed copolymer latex thereof further comprises, in polymerized form and based upon the polymer solids of such preformed copolymer latex, from about 0.5 to about 10 weight percent of an ethylenically unsaturated carboxylic acid.

3. The aqueous paper coating composition of claim 1 wherein the preformed copolymer latex thereof further comprises, in polymerized form, an ester of an ethylenically unsaturated carboxylic acid.

4. The aqueous paper coating composition of claim 1 wherein the alkali-sensitive copolymer latex is present in an amount corresponding to from about 3 to about 30 parts by weight on a polymer solids basis based upon 100 parts by weight of the pigment solids.

5. The aqueous paper coating composition of claim 4 wherein the total solids content is in the range of from about 30 to about 65 weight percent based upon the total weight of said composition.

6. The aqueous paper coating composition of claim 1 wherein the pH of said composition is from about 7.5 to about 13.

7. The aqueous paper coating composition of claim 1 wherein the preformed copolymer latex is a copolymer comprising, in polymerized form, styrene, butadiene, an alkyl or hydroxyalkyl acrylate or methacrylate and acrylic or methacrylic acid and wherein the monomer mixture copolymerized in the presence of said copolymer latex comprises, based upon the weight of such monomer mixture, from about 10 to about 60 weight percent of acrylic or methacrylic acid and from about 40 to about 90 weight percent of an ester of a saturated aliphatic alcohol or an aromatic alcohol with acrylic or methacrylic acid.

8. The aqueous paper coating composition of claim 7 wherein the saturated aliphatic or aromatic alcohol ester of acrylic or methacrylic acid of the monomer mixture thereof is an alkyl ester of such acid, said alkyl group having from 1 to about 8 carbon atoms.

9. The aqueous paper coating composition of claim 8 wherein the $C_1$ to about $C_8$ alkyl ester of acrylic or methacrylic acid is methyl methacrylate.

10. The aqueous paper coating composition of claim 1 additionally comprising at least one pigment.

11. A coated paper product comrising a paper sheet carrying a dried deposit of aqueous coating composition of claims 1 or 10.

* * * * *

UNITED STATES PATENT AND TRADEMARK OFFICE
CERTIFICATE OF CORRECTION

PATENT NO. : 4,265,977
DATED : May 5, 1981
INVENTOR(S) : Takayuki Kawamura, Kichiya Tazaki
Takashi Sakakiyama, Toshio Hasegawa It is certified that error appears in the above—identified patent and that said Letters Patent is hereby corrected as shown below:

Column 2, line 32, delete "nonovinylidene" and insert --monovinylidene--.

Column 3, line 37, delete "s" and insert --as--; line 40, delete "conjungated" and insert --conjugated--.

Column 4, line 62, delete "methcrylate" and insert --methacrylate--.

Column 5, line 39, delete "even" and insert --event--; line 53, delete "undesirbly" and insert --undesirably--.

Column 6, line 13, delete "methcrylate" and insert --methacrylate--; line 44, delete "coplymer", and insert --copolymer--; line 53, delete "chage" and insert --charge--; line 56, delete "latex" and insert --later--.

Column 7, line 13, delete "aciid" and insert --acid--.

Column 8, line 45, delete "into" and insert --onto--.

Column 15, line 28, delete "that" and insert --test--; line 63, delete "tests" and insert --test--.

Column 19, line 44, after "Claim 1", insert --or 11--; line 50, after "Claim 1", insert --or 11--.

UNITED STATES PATENT AND TRADEMARK OFFICE
CERTIFICATE OF CORRECTION

PATENT NO. : 4,265,977
DATED : May 5, 1981
INVENTOR(S) : Takayuki Kawamura, Kichiya Tazaki
Takashi Sakakiyama, Toshio Hasegawa It is certified that error appears in the above—identified patent and that said Letters Patent is hereby corrected as shown below:

Column 20, line 14, delete "1" and insert --11--; line 23, after "Claim 1", insert --or 11--; line 26, after "Claim 1", insert --or 11--; line 31, delete "mixxture" and insert --mixture--; line 48, delete "comrising" and insert --comprising--.

Signed and Sealed this

Twenty-seventh Day of October 1981

[SEAL]

Attest:

GERALD J. MOSSINGHOFF

*Attesting Officer*  *Commissioner of Patents and Trademarks*